United States Patent
Marchisseau et al.

(10) Patent No.: US 6,770,157 B2
(45) Date of Patent: Aug. 3, 2004

(54) METHOD AND APPARATUS FOR ADHESIVE FASTENING OF FRICTION CLUTCH LINERS ON A SUPPORT PLATE

(75) Inventors: Michel Marchisseau, Limoges (FR); Gilles Causse, Limoges (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/988,398

(22) Filed: Nov. 19, 2001

(65) Prior Publication Data

US 2002/0061360 A1 May 23, 2002

(30) Foreign Application Priority Data

Nov. 20, 2000 (FR) ............................................ 00 14929

(51) Int. Cl.$^7$ ............................................. B32B 31/20
(52) U.S. Cl. ......................... 156/64; 156/297; 156/299; 156/295
(58) Field of Search ................................ 118/316, 220, 118/212; 156/64, 297, 299, 295, 356, 378, 379, 578; 427/208; 188/17, 18 A, 73.1, 73.2, 73.3, 218 XL; 428/66.2

(56) References Cited

U.S. PATENT DOCUMENTS

| 5,196,081 A | 3/1993 | Bicknell |
| 5,452,783 A | 9/1995 | Thirion De Briel et al. |
| 5,810,969 A | 9/1998 | Marchisseau et al. |
| 6,042,935 A * | 3/2000 | Krenkel et al. .......... 428/307.7 |
| 6,102,184 A | 8/2000 | Bacher et al. |
| 6,500,294 B1 * | 12/2002 | Honda et al. ................ 156/265 |
| 6,530,339 B1 * | 3/2003 | Silverbrook ................. 118/46 |

FOREIGN PATENT DOCUMENTS

| EP | 0 365 159 A1 | 4/1990 | |
| EP | 0 579 544 A1 | 1/1994 | |
| EP | 0 781 937 A1 | 7/1997 | |
| EP | 0 797 017 A1 | 9/1997 | |
| EP | 0 806 586 A2 | 11/1997 | |
| JP | 3-88347 A * | 4/1991 | ........... H01L/21/60 |

* cited by examiner

Primary Examiner—Richard Crispino
Assistant Examiner—George R. Koch, III
(74) Attorney, Agent, or Firm—Liniak, Berenato & White

(57) ABSTRACT

A clutch plate consists of an annular support plate carrying friction liners adhesively bonded on at least one lateral fastening face of peripheral radial blades of the support plate, by a method including an adhesive applying step which consists in depositing a predetermined quantity of adhesive on, but only on, an adhesion zone located on the lateral fastening face of each successive radial blade. This deposition is performed by an adhesive applicator having an adhesive applying zone of a form corresponding to that of the adhesion zone on the blade. The method is performed in an apparatus having at least one applicator head.

10 Claims, 3 Drawing Sheets

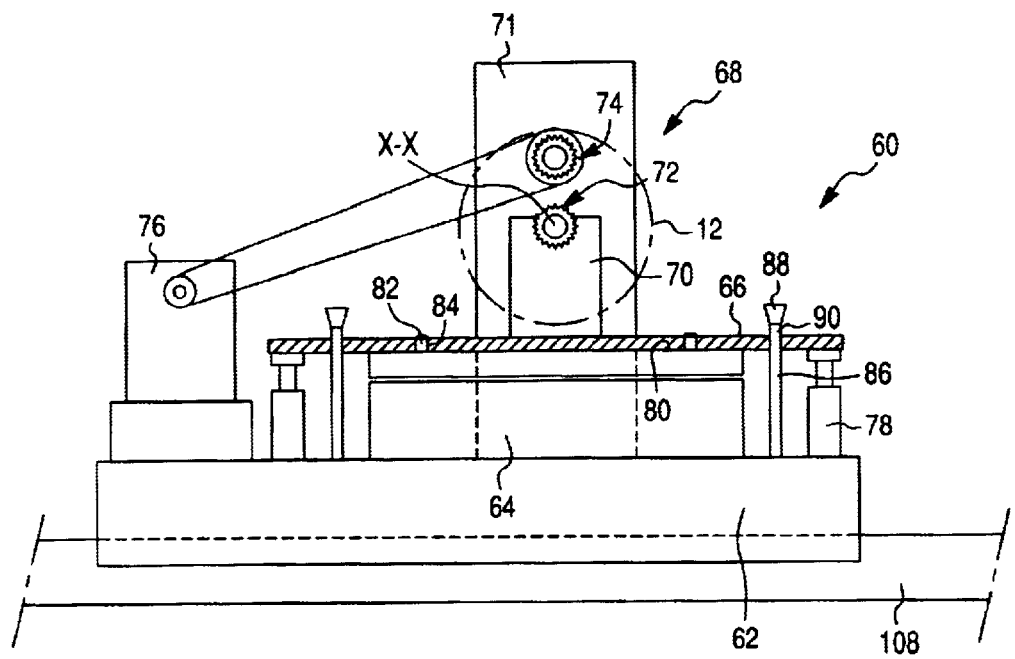
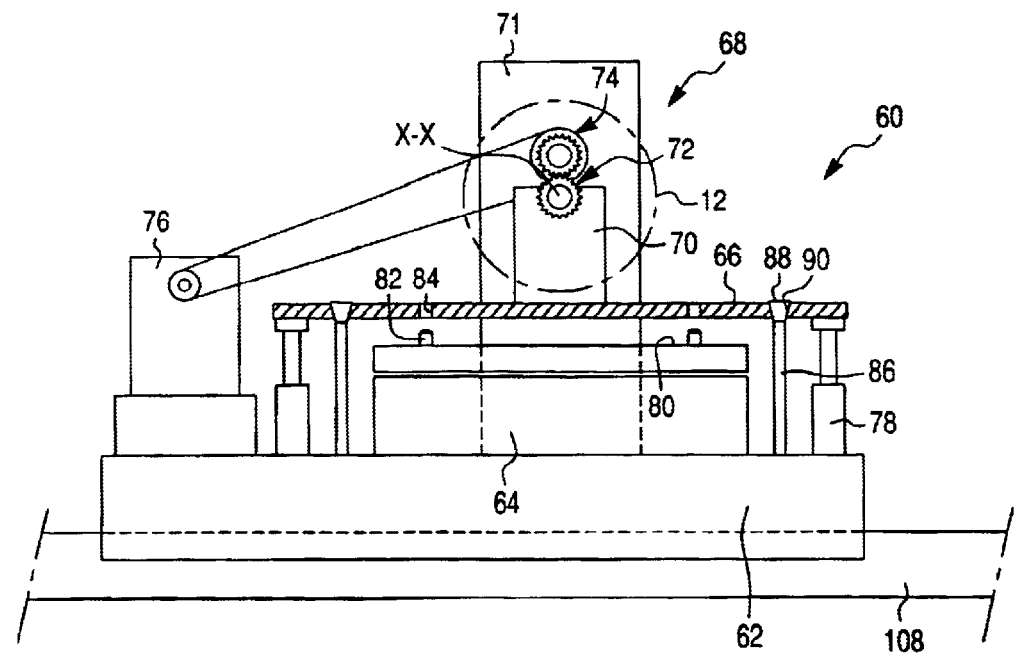

METHOD AND APPARATUS FOR ADHESIVE FASTENING OF FRICTION CLUTCH LINERS ON A SUPPORT PLATE

TECHNICAL FIELD OF THE INVENTION

This invention relates to methods and apparatus for adhesively fastening friction liners in place, in particular on an annular support plate, in a component such as an automotive clutch.

STATE OF THE ART

At the present time, friction liners are used for example in the manufacture of friction discs, especially for dry clutches for motor vehicles. A friction disc generally comprises a support plate in the form of an annular ring having an outer peripheral portion which is divided into radial blades. These blades have a central fastening portion, bounded by cranked or bent portions of the plate, which is joined to the central portion of the plate through a tangential cranked portion which forms the foot of the blade.

This tangential cranked portion offsets the central fastening portion axially with respect to the general plane of the central part of the support plate. Friction liners are secured on either side of the outer peripheral portion.

Fastening of the liners on the radial blades can be achieved for example by riveting or adhesive bonding, by a method which is described in U.S. Pat. No. 6,102,184 and the corresponding published international patent specification WO98/44272A. That method comprises an adhesive applying step which consists in depositing a predetermined quantity of adhesive on an adhesion zone positioned on the lateral fastening face of the radial blade.

Where adhesive bonding of the friction liners is used, the quality of deposition of the adhesive is very important. In this connection, the friction discs are subjected to very high stresses in use. The quantity and distribution of the adhesive at the interface between the radial blades of the support plate and the friction liners are critical factors in the mechanical strength and consistency of performance of the friction disc.

Known methods and apparatus for adhesively fastening friction liners on the support disc work on the basis of using a nozzle to deposit a band of adhesive on a fastening face of the blades of the support plate. However, such methods do not enable sufficiently precise control to be achieved in the quantity of adhesive deposited. It often happens that stray particles of excess adhesive will occur, and these can give rise to significant malfunctioning, especially where the blades are of the tripod type and where the excess adhesive is on a support face of a peripheral portion of the blade.

In addition, the known methods and apparatus do not enable reliable quantity control to be exercised on support plates having faulty adhesive application, or those which may have such faults.

OBJECT OF THE INVENTION

With a view to overcoming the above mentioned drawbacks, the invention, in a first aspect thereof, proposes a method of adhesively fastening friction liners on at least one of the lateral fastening faces of the radial blade located on the outer periphery of an annular support plate, the method being of the type which includes an adhesive application step that consists in depositing a predetermined quantity of adhesive on an adhesion zone positioned on the said fastening face of the radial blade, characterised in that the step of depositing adhesive is carried out by means of an adhesive application head which includes an adhesive application zone, the form of which corresponds to that of the adhesion zone on the lateral fastening face of the blade.

Thanks to the invention, the fastening face of the blade does not need to be formed in relief as described in European patent specification No. EP 0 797 017. The application of adhesive is both reliable and economic.

According to a preferred feature of the invention, the adhesive applying step comprises a first phase in which the adhesive applying zone of the applicator head is impregnated with adhesive, and a second phase, or application phase, which consists in bringing the impregnated adhesive applying zone of the applicator head into contact under axial pressure with the adhesion zone on the appropriate face of the blade, whereby to transfer the correct predetermined quantity of adhesive from the head to the blade.

According to a further feature of the invention, during the second phase of the method, a backing or counter-pressure head comes into engagement against the other lateral face of the blade which is opposed to the said lateral fastening face, so that the backing head applies on the said other face an axial force opposed to that exerted by the applicator head on the lateral fastening face, thereby preventing deformation of the blade.

Preferably, the two lateral faces of the blade have adhesive applied simultaneously to them by two respective applicator heads, the application zones of which are arranged in facing relationship with the adhesion zones of each of the lateral fastening faces.

Preferably, the adhesive applying step is followed by rotation of the support plate in such a way as to put the adhesion zone of the fastening face of another radial blade into facing relationship with the adhesive applying zone of the applicator head.

The method preferably also includes a step of controlling the application of adhesive on at least one lateral fastening face.

According to another preferred feature of the invention, an optical system enables the presence of adhesive outside the adhesion zone of the fastening face to be detected; and according to a further feature, an optical system enables the absence of adhesive on at least part of the adhesion zone to be detected.

Where such an optical system detects the presence of adhesive outside the adhesion zone, and/or the absence of adhesive on part of the adhesion zone, the support plate, carrying the incorrectly applied adhesive, is rejected at this stage.

According to a further preferred feature of the invention, such an optical system determines the real position of the adhesion zone, carrying adhesive, on the fastening face of the blade; then it compares this real position with a theoretical position of the adhesion zone, and if these two positions are different, then the support plate, which has been at least partly coated with adhesive, is rejected.

According to a second aspect of the invention, in an apparatus for adhesively fastening friction liners on at least one of the lateral fastening faces of a radial blade projecting at the outer periphery of an annular support plate, the apparatus being of the type that includes means for depositing a predetermined quantity of adhesive on an adhesion zone positioned on the fastening face of the radial blade, the apparatus is characterised in that the means for depositing adhesive comprise at least one adhesive applicator head, having an adhesive applying zone which lifts adhesive in a reservoir or in a shallow recess (or "footprint"), and deposits the predetermined quantity of adhesive on the adhesion zone of the appropriate fastening face of the appropriate blade.

According to a preferred feature of the invention, the applicator head deposits the predetermined quantity of adhesive on the adhesion zone by contact, under axial pressure, of the adhesive applying zone with the adhesion zone of the fastening face.

The apparatus preferably includes a counter-pressure or backing head which is engaged against the lateral face of the blade that is opposed to the lateral fastening face of the latter, and which applies on the said lateral face of the blade an axial force opposed to that exerted by the applicator head on the lateral fastening face, whereby to prevent deformation of the blade.

The apparatus preferably includes means for rotating the support plate in such a way as to put the successive lateral fastening faces of different blades into facing relationship with the applicator head for the purpose of applying adhesive to them.

The drive means preferably include indexing means for positioning the adhesion zone in facing relationship with the adhesive applying zone of the applicator head.

The apparatus preferably includes means for controlling the adhesive zone to which adhesive is applied. These control means preferably comprise an optical viewing device which, in particular, controls the position of the adhesive zone and/or the distribution of adhesive on the lateral fastening face.

According to another preferred feature of the invention, the said control means include a weighing device which controls the quantity of adhesive deposited on at least one adhesion zone of a lateral fastening face of a blade.

The apparatus may include two adhesive applicators, each of which is situated in facing relationship with an adhesion zone on the lateral fastening faces of a blade.

The apparatus may include a reserve supply of adhesive which feeds at least one adhesive reservoir in such a way as to maintain the filling level of the latter at a level greater than a limiting lower level.

The apparatus preferably includes a device for cleaning the adhesive applying zone of at least one adhesive applicator.

Further features and advantages of the invention will appear more clearly from a reading of the following detailed description of some preferred embodiments of the invention, which is given by way of non-limiting example only and with reference to the accompanying drawings.

BRIEF DESCRIPTION OF THE DRAWINGS

FIG. 2 is a diagrammatic view of an apparatus for carrying out adhesive fastening in accordance with the invention, in a weighing position.

FIG. 3 is a view similar to FIG. 2, but shows the apparatus in an adhesive fastening position.

DESCRIPTION OF PREFERRED EMBODIMENTS OF THE INVENTION

In this description, by way of non-limiting illustration, an axial and transverse orientation will be used, in conformity to the orientation of the axis of rotation X-X of the friction disc and with a transverse plane which lies at right angles to it. In addition, an inner and outer orientation with respect to the median transverse plane of the friction disc will be used.

Figure 1:
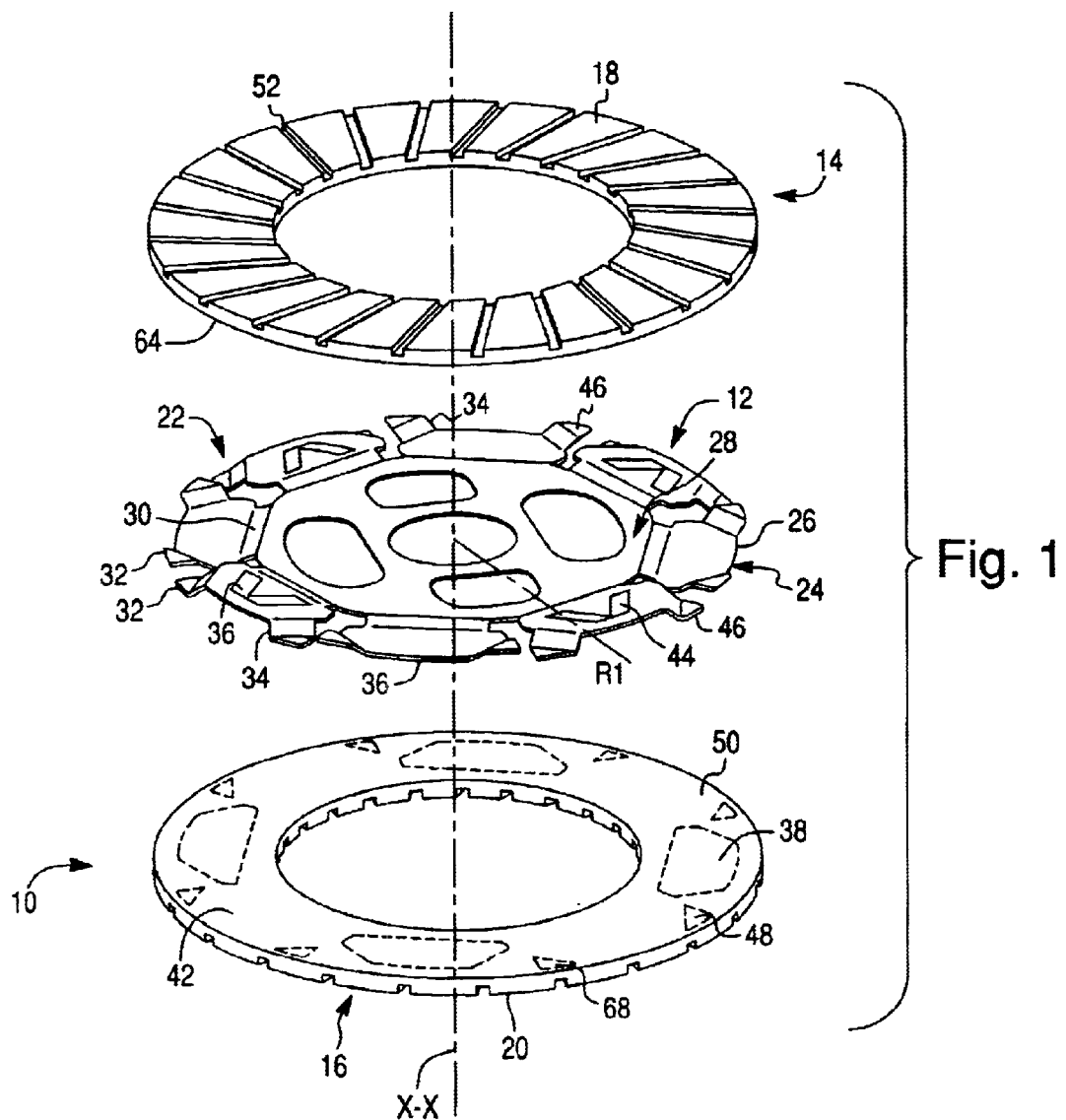
FIG. 1 is an exploded perspective view showing a friction disc on the blades of the support plate, the adhesion surfaces of which are shown.

The exploded perspective view of FIG. 1 shows a friction disc 10 which is adapted in particular for use in a friction wheel of a dry clutch for a motor vehicle. Such a disc is described for example in the specifications of European patent publications Nos. EP 0 579 554A and EP 0 781 937A. For more details, reference should be made to those documents.

The friction disc 10 consists mainly of a support plate 12, which has an outer annular periphery on which friction liners 14 and 16 are attached. The support plate 12 is fabricated by press-forming and bending from a thin metal blank.

The friction liners 14 and 16 may be in the form of a continuous annular ring as shown, or they may consist of blocks or tiles which are bounded by edges which are for example oriented generally radially. The liners 14 and 16 are made of a suitable friction material such as a composite material or a ceramic material. They are of substantially constant thickness.

Thus, during an enclutching operation, that is to say a phase during which the clutch is in the process of being engaged, a pressure plate and a reaction plate of the clutch, which are not shown but which are coupled with the engine flywheel, move progressively into axial gripping engagement with the friction faces 18 and 20 of the friction liners 14 and 16 respectively. This causes the primary shaft of the gearbox to be driven in rotation through the friction disc.

The support plate 12, which is in the form of an annular ring, has an outer peripheral portion 22 which, in this example, is divided into radial blades 24. Each radial blade 24 consists of a central fastening portion 26, which in this example is of substantial extent and which is joined to a central portion 28 of the support plate 12 through a tangential cranked portion 30 that constitutes the foot of the blade 24. This cranked portion offsets the central fastening portion 26 axially from the general plane of the central portion 28 of the support plate 12. The median plane of the central portion 28 defines a median transverse plane of the friction disc 10.

In this example, the support plate 12 has eight radial blades 24, which are spaced apart circumferentially at regular intervals about the central axis X-X. The radial blades 24 are offset axially in alternate directions with respect to the central portion 28, so that the central fastening portions 26 of the blades define two radial planes which will be called here an upper plane and a lower plane, with respect to the median transverse plane of the central portion 28 of the plate 12. The cranked portion 30, for each blade, extends at right angles to the radial axis of symmetry of the blade concerned.

In accordance with a known design, as disclosed for example in U.S. No. Pat. 5,452,783 (and the equivalent European patent specification No. 0 579 554), each blade 24 is of the so-called tripod type. Thus, each radial blade 24 has, besides the central fastening portion 26, two peripheral engagement portions 32. Each tripod blade 24 has a general design symmetry with respect to a median radial axis R1.

Thus, the two peripheral engagement portions 32 are disposed tangentially on either side of the central fastening portion 26, which has itself a design symmetry with respect to the radial axis of symmetry R1.

The two peripheral engagement portions 32 are flat. They are situated in a plane which is offset axially. In this example they lie in the above mentioned upper plane when the central fastening portion 26 lies in the lower plane, and vice versa.

The peripheral engagement portions 32 of a blade 24 are joined to the central fastening portion 26 through a cranked portion 34 which extends obliquely to the radial axis of symmetry R1. Thus, the upper and lower planes contain the central fastening portion 26 of a radial blade 24 and the two pairs of peripheral engagement portions 32 of the two adjacent blades 24.

During assembly of the friction disc 24, a lateral fastening face 36 of each central fastening portion 26 comes into contact on a fastening zone 38, bounded by broken lines in FIG. 1, of an inner fastening face 40 and 42 of the friction liners 14 and 16 respectively.

The friction liners 14 and 16 are adhesively bonded to the central portions 26 of the blades 24. For this purpose a suitable adhesive is deposited on adhesion zones 44 of the lateral fastening faces 36 in facing relationship with the fastening zones 38.

Lateral engagement faces 46 of the peripheral engagement portions 32 of a central fastening portion 26 are engaged on abutment zones 48 of the appropriate liner 16 or 14 opposite to that on which the corresponding central portion 26 is fixed. In FIG. 1 the abutment zones 48 are denoted by broken lines.

In this example, the lateral engagement zones 46 are in simple abutment on the facing abutment zones 48, so as to enable the peripheral engagement portions 32 to slide with respect to the corresponding liner 14 or 16 during the clutch engaging operation. This causes the liners 16 and 14 to move closer together, and consequently causes the support plate 12 to become deformed.

The portions of the internal fastening surfaces 40 and 42 of the friction liners 14 and 16 which are neither fastening zones 38 nor abutment zones 48 are referred to as free zones 50.

In order to optimise cooling of the friction liners 14 and 16, the friction faces 18 and 20 are formed with generally radially oriented grooves 52 which are slightly inclined with respect to a radial direction.

So as to ensure optimum operation and the maximum possible useful life of the friction disc 10, it is necessary that the deposition of adhesive on the adhesion zone 44 is performed accurately, that is to say the quantity of adhesive deposited must be predetermined; it must be deposited homogeneously over the adhesion zones 44; and these latter must be positioned precisely in the lateral fastening faces 36. Thus, no trace of adhesive must be deposited on any other part, such as on a peripheral portion 32 or a cranked portion 30 or 34. In this connection, a lack of adhesive on an adhesion zone 44 renders the assembly more fragile and reduces the working life of the friction disc 10.

On the other hand, any trace of adhesive outside an adhesion zone 44 may give rise to adhesive bonding of another part of the support plate 12 with an internal face 40 or 42 of a friction liner 14 or 16, and in particular a peripheral portion 32. This can give rise to malfunctioning of the friction disc 10. In this connection, as described above, the lateral faces of the peripheral engagement portions 32 are in abutment on the abutment zones 48 that lie facing them, so as to enable the peripheral engagement portions 32 to slide with respect to the corresponding liners 14 or 16.

Thus, adhesive bonding of the abutment zones 48 leads to failure in the progressive action of the clutch engaging operation.

Where a trace of adhesive spills over on a cranked portion, this is detrimental to the progressive gripping action of the faces 18 and 20 of the liners.

These disadvantages are remedied by the method and adhesive fastening apparatus provided by the present invention. The method and apparatus relate, in the context of the present example, to the adhesive fastening of the friction liners 14 and 16 on the support plate 12. The invention also enables the conformity of the deposit of adhesive to be controlled in such a way that those support plates 12 in which any error in the adhesive fastening has occurred are immediately rejected and scrapped.

Such defects are difficult to detect where the liners are adhesively bonded, and the costs due to rejection of complete friction discs 10 which are judged to be faulty because of an adhesive bonding fault in its support plate 12 are much reduced.

Reference is now made to FIGS. 2 and 3, showing an apparatus 60 for fastening the friction liners 14 and 16 by adhesive bonding on the support plate 12. This apparatus 60 is arranged to deposit a quantity of adhesive on an adhesion zone 44, and to control this quantity so that it corresponds to the predetermined quantity for optimum adhesive bonding of the friction liners 14 and 16.

To this end, the main components of the apparatus 60 are a body 62 equipped with a balance 64, on which a movable plate 66, for indirectly carrying the annular support plate 12, can be placed. Drive means 68, for rotating the support plate 12 about its axis, are arranged on the fastening apparatus 60. The drive means 68 in this example consist of two pinions 72 and 74.

The first pinion 72 is mounted, for rotation about a fixed axis, on an arm 70 which is attached to, and extends vertically upwards from, the movable plate 66. The plate 12 is mounted removably and coaxially on the pinion 72, so as to be rotated by the latter. The second pinion 74 is carried by a support frame 71, and is driven in rotation by a drive unit 76. The base plate 66 is movable up and down vertically under the control of jacks 78.

The adhesive application step is preceded by a step of weighing the base plate 66 with the plate 12 mounted on its pinion 72. For this purpose, the jacks 78 are in their lower position, so that the plate 66 rests on the balance 64. This is the weighing position shown in FIG. 2, in which the teeth of the pinions 72 and 74 are out of mesh with each other. The plate 66, with the plate 12, can thus be weighed without the measurement being affected by friction of the base plate 66 with any outside component, such as the second pinion 74.

In addition, the upper face 80 of the balance 64 is provided with positioning pins 82 which cooperate with centering holes 84 formed through the base plate 66, so that the latter will not rub frictionally on guides 86 that extend through it. These guides 86 guide the vertical movement of the base plate. This arrangement improves the precision with which the weighing operation is carried out.

The weight of the base plate 66 and the support plate 12 carried by it, the latter having no adhesive yet applied to it, are together established in the weighing step. The measured value is stored in the memory of a control system, not shown, of the adhesive fastening apparatus 60.

The adhesive application step consists initially in maneuvering the jacks 78 in such a way that they raise the base plate 66. The latter is guided in translation by the guides 88 which are also arranged to stop it at the end of its vertical travel. In this connection, the upper end of each guide 86 is in the form of an inverted convex cone 86 which is in cooperation with a complementary concave conical aperture 90 formed through the base plate 66.

The upper position of the base plate 66 shown in FIG. 3 is called the adhesive fastening position. In this position the teeth of the pinion 72 are in mesh with those of the pinion 74, so that rotation of the latter causes the pinion 72 and the support plate 12 to be rotated.

In this connection it should be noted that the drive unit 76 can consist of an electric stepping motor which enables the position of the plate 12 to be precisely indexed.

Figure 4:
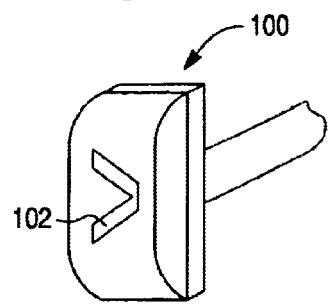
FIG. 4 is a perspective view showing an adhesive fastening head of the fastening apparatus.

The step of depositing adhesive is performed by means of an adhesive fastening head or applicator 100 which is shown on a larger scale in FIG. 4. It includes an adhesive applying zone 102, the form and dimensions of which correspond to the adhesion zone 44 on the lateral fastening faces 36 of the radial blades 24.

The adhesive fastening step is carried out in two phases, namely a first or impregnating phase and a second or application phase. In the impregnation phase, the adhesive applying zone of the applicator 100 is impregnated with adhesive. In the application phase, the impregnated adhesive applying zone 102 of the applicator is brought into contact, under axial pressure, with the adhesion zone 44 of the lateral fastening face 36 of a blade 24. In this way, the predetermined quantity of adhesive is transferred from the applicator 100 to the lateral face of the blade 24.

The applicator 100 may for example be of a material including silicone.

Figure 5:
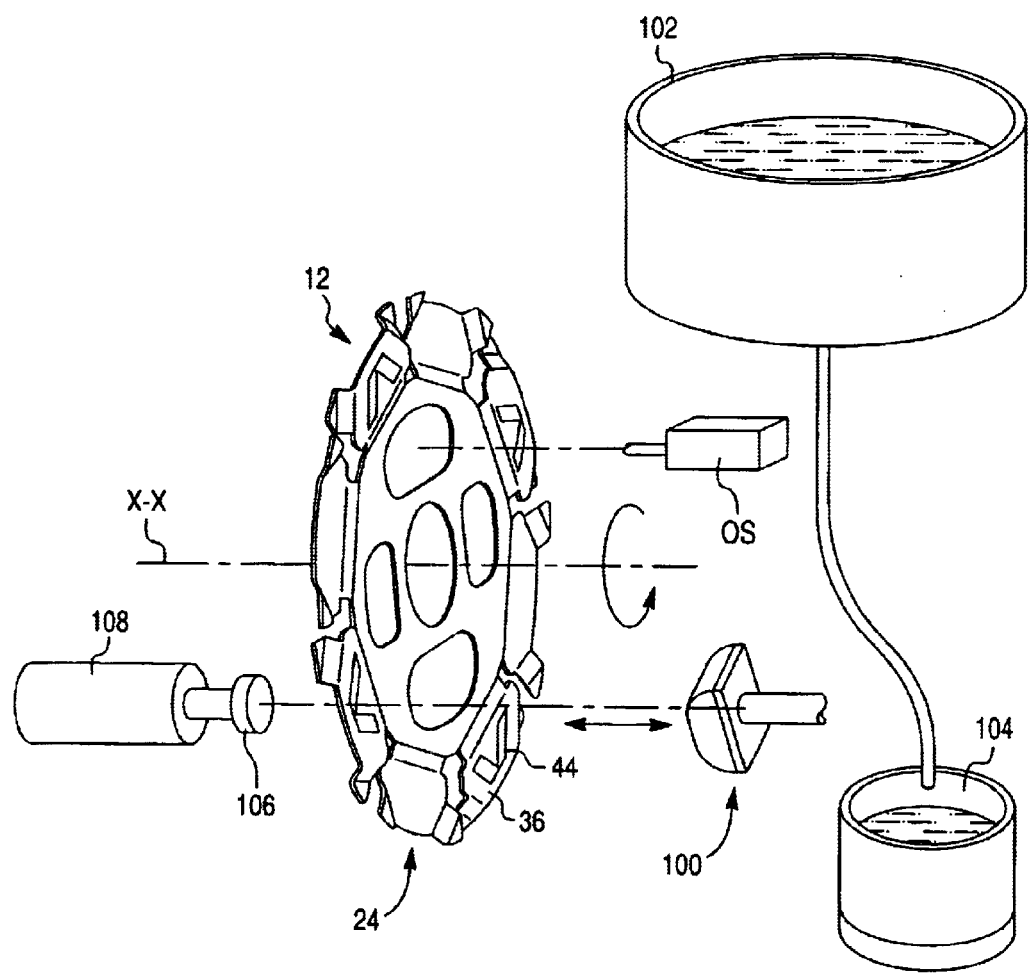
FIG. 5 is a diagrammatic perspective view showing those elements of the fastening apparatus that are involved in the deposition of a predetermined quantity of adhesive on the fastening faces of the support plate.

The first or impregnation phase consists in immersing the portion of the applicator on which the adhesive applying zone 102 is formed, in a tank of adhesive 104, FIG. 5. The adhesive applying zone 102 is then covered with a quantity of adhesive which is greater than or equal to the predetermined quantity of adhesive which is to be deposited on the adhesion zone 44.

The apparatus 60 includes a mechanism, not shown, which permits the adhesive applying zone 102 of the applicator 100 to move between the adhesive reservoir 104 and the adhesion zone 44. The level in the reservoir 104 must always be higher than a limiting lower level, so as to ensure that the adhesive applying zone 102 is correctly covered with adhesive.

The apparatus 60 also includes a reserve supply of adhesive 105 which feeds the tank 104 so as to maintain its filling level at a level greater than the above mentioned lower limit, thereby limiting the number of adhesive refilling operations necessary for the tank 104. The adhesive reserve tank 105 has a storage capacity greater than that of the tank 104, and thereby necessitates less frequent refilling operations. In addition it is connected to the reservoir 105 through a pipe which may be flexible, which enables it to be mounted on the apparatus 60 in a readily accessible place.

In another version, not shown, the initial impregnation phase may consist in filling with adhesive a shallow cavity, or footprint, formed on a first zone of a plate similar to a printing plate. The form of the footprint corresponds to that of the adhesion zone of the adhesive fastening applicator. For this purpose, the lower wall of the adhesive tank has an aperture, and it is a second zone of the footprint plate which constitutes the base. Filling of the recess consists in sliding the footprint plate transversely with respect to the tank, in such a way that the first zone slides under the aperture in the bottom of the tank. The reservoir is then said to be of the "wiping" type. In this way the recess is filled with adhesive.

A reverse transverse movement disengages the footprint recess, filled with adhesive, from the tank. The adhesion zone of the adhesive fastening head is then brought into contact with this filled recess in the first zone of the plate, so as to transfer to the former a quantity of adhesive which is greater than or equal to the predetermined quantity of adhesive that is to be deposited on the adhesion zone 44 of the support plate.

The head 100 may also include means, not shown, for feeding adhesive to the adhesive applying zone 102. It may further be made of a porous material which enables adhesive to be transferred between an integral reservoir and the zone 102.

In the second or application phase of the process, a counter-pressure or backing head 106, which is movable axially, being for example driven by a jack 108, is brought into engagement against the side face of the radial blade 24 which is opposed to the lateral fastening face 36. The backing head 106 applies on the opposite lateral face an axial force which is opposed to the force exerted by the applicator head 100 on the lateral fastening head 24 on which adhesive is to be applied.

With reference to FIG. 5, this shows only one adhesive fastening head 100 and one backing head 106. Here, however, two similar elements are arranged symmetrically with respect to the plane of the central portion 28 of the support plate 12, in such a way as to apply adhesive to the adhesion zones 44 situated on the fastening faces 36 which are of opposite orientation.

In a further version, where the radial blades 24 are situated in the same plane as the central portion 28 of the support plate 12, and include an adhesion zone on each of their lateral faces, they may have adhesive applied simultaneously to both of them by two applicators.

In this case therefore, the backing head is omitted, with each of the two applicators applying an equal axial force on the radial blade 24.

When adhesive has been applied to a blade 24, the driving member rotates the driving means 68 through one pitch, and therefore rotates the annular support plate 12 in such a way that the adhesion zone 44 of another radial blade 24 is positioned opposite the adhesive applying zone 102 of the applicator head 100. The adhesive applying step is then repeated. The process is continued until all of the adhesion zones 44 of the radial blades 24 have had adhesive applied to them.

The base plate 66 of the apparatus is now once again positioned on the balance 64 in its weighing position, so that the combined weight of the plate 66 and the support plate 12, with the adhesive now applied to it, can be determined. The value of the weight previously measured (without adhesive) is now subtracted from this new value so as to determine with great precision the quantity of adhesive which has been deposited on the support plate 12 in the adhesive applying step. This value is now compared with the value, in terms of adhesive weight, which has been predetermined as giving optimum adhesive bonding of the liners 14 and 16 on the support plate 12.

If the absolute value of the difference between the two weights is greater than a predetermined threshold value, then the support plate 12 has an incorrect amount of adhesive, that is to say too little or too much, and the support plate 12 is rejected and scrapped.

The difference in the two values of adhesive weight, measured and theoretical, may also be compared with a higher threshold value and a lower threshold value, in which the absolute values of these thresholds are different.

All this avoids the unnecessary performance of subsequent steps in the manufacturing process, and avoids waste of materials, where the friction disc 10 would not have the desired characteristics. It applies a desirable element of quality control at the earliest possible stage in the process.

The adhesive applying step causes the adhesive applying zone 102 of the applicator head 100 to become dirty. It is therefore necessary to clean it in such a way as to remove the residues of adhesive adhering to it. To this end it is of advantage to make use of an adherent element with which the zone 102 is brought into contact. When the applicator head is then separated from this adherent element, the adhesive residues remain caught by this element. This adhesive element is preferably in the form of a moving tape. In this way, every time it cleans the adhesive applying zone 102, it is stepped forward by one step so as to present a new adherent surface on the next cleaning operation of the applicator head.

The adhesive used in this process is generally viscous and tends to impregnate the moving elements of the device by which the applicator head 100 is cleaned, and particularly the driving elements. It is therefore preferable to treat them with a surface coating having anti-adherent properties. Such a coating may for example be of polytetrafluorethylene.

In another version, the fastening method includes a step in which the quality of the deposition of adhesive is controlled. In this step, the position of the adhesion zone 44, and the distribution of adhesive in this zone, are verified. For this purpose, the fastening apparatus 60 may for example include a suitable optical system OS. The differences in optical behaviour between the adhesive and steel are such that an optical system can easily differentiate the zones which are covered with adhesive from those which are not. Thus, the optical system enables the positioning of an adhesion zone 44 to be determined with precision by processing the signal that it supplies, such as a count of the pixels in an image.

The determined real position of the adhesion zone 44 is compared with its theoretical position. In a manner similar to that relating to the quantity of adhesive deposited, the adhesive-bearing support plate 12 is rejected and scrapped when the difference between the real position and theoretical position is too great.

The optical system also detects any lack of adhesive in the adhesion zone 44 and traces of adhesive on the zones of the support plate 12 different from the adhesion zone 44. In that case, the application of adhesive is incorrect and the support plate is rejected and scrapped.

The quality control step on an adhesion zone 44 of a radial blade 24 can be carried out while adhesive is being applied on another blade 24.

In general terms, the fastening surfaces 36 of the radial blades 24 undergo treatments such as sand blasting or etching in an acid bath, in order to improve attachment of the adhesive.

Before adhesive is deposited on a fastening surface 36, the optical system may also be used to monitor its surface condition, in such a way as to detect a defective zone which would not permit sufficiently good attachment of the adhesive. Where such a zone is detected, the support plate 12 is rejected and scrapped.

After the quality control step, the support plate 12, carrying adhesive, is moved to the next station at which, in particular, the friction liners 14 and 16 are adhesively bonded.

The adhesive applying apparatus 60 is preferably mounted for sliding movement along a guide rail 108.

In the above examples, the adhesion zones 44 are, by way of example only and without any limitation being implied, V-shaped. Any other form may be envisaged within the scope of the invention. For example the adhesion zone may be triangular.

In all cases, with the use of the invention the deposit of adhesive is reduced to a minimum so that manufacturing costs are reduced.

What is claimed is:

1. A method of securing friction liners on an annular support plate, the support plate having an outer periphery defining a radial blade having opposed lateral faces including at least one lateral fastening face which defines an adhesion zone of predetermined form positioned on the fastening face, the method being a method of adhesively bonding said friction liners on at least one said lateral fastening face and comprising:
    an adhesive applying step which consists in depositing a predetermined quantity of adhesive on an adhesion zone, wherein said deposition of adhesive is carried out by means of an adhesive applicator defining an adhesive applying zone the form of which corresponds to that of said adhesion zone,
    a control step for controlling the application of adhesive on the adhesion zone using an optical system.

2. A method according to claim 1, wherein the adhesive applying step comprises:
    a first, impregnation, phase which comprises impregnating with adhesive said adhesive applying zone of the applicator head,
    and a second, adhesive applying, phase which comprises the step of bringing the impregnated adhesive applying zone of the applicator head into contact, under axial pressure, with said adhesion zone, whereby to transfer a predetermined quantity of adhesive from the applicator head to said blade of the support plate.

3. A method according to claim 2, wherein the said second phase further includes applying a backing head against the lateral face of said blade opposed to said lateral fastening face, whereby to apply on said opposed face an axial force opposite to that exerted by the applicator head on said lateral fastening face, thereby avoiding deformation of the blade.

4. A method according to claim 1, wherein, said opposed lateral faces of each said radial blade being fastening faces, the adhesive applying step comprises the use of two applicator heads, each having said adhesive applying zone, said adhesive applying zones being in facing relationship to the said adhesion zones of each of the lateral fastening faces, the applicator heads being applied to the two fastening faces simultaneously.

5. A method according to claim 1, further including, following the adhesive applying step, rotating the support plate whereby to put said adhesion zone on the fastening face of a further said radial blade of the support plate into a position opposite the adhesive applying zone of the applicator head.

6. A method according to claim 5, wherein said step of controlling the application of adhesive is performed to at least one said lateral fastening face.

7. A method according to claim 6, wherein said control step comprises using said optical system to detect the presence of adhesive on said support plate but outside said adhesion zone.

8. A method according to claim 6, wherein said control step comprises using said optical system to detect absence of adhesive on at least part of the adhesion zone.

9. A method according to claim 8, further including the step of rejecting the support plate when said optical system detects at least one situation selected from the group consisting of the presence of adhesive or support plate but outside the adhesion zone and absence of adhesive on at least part of the adhesion zone.

10. A method according to claim 8, wherein the said control step comprises using said optical system to determine the real position of said adhesion zone, carrying adhesive, with respect to the corresponding said lateral fastening face of said blade, the control step further including comparing said real position with a theoretical position of the adhesion zone, and rejecting the support plate if the two said positions are different from each other.

* * * * *